United States Patent Office 3,298,301
Patented Jan. 17, 1967

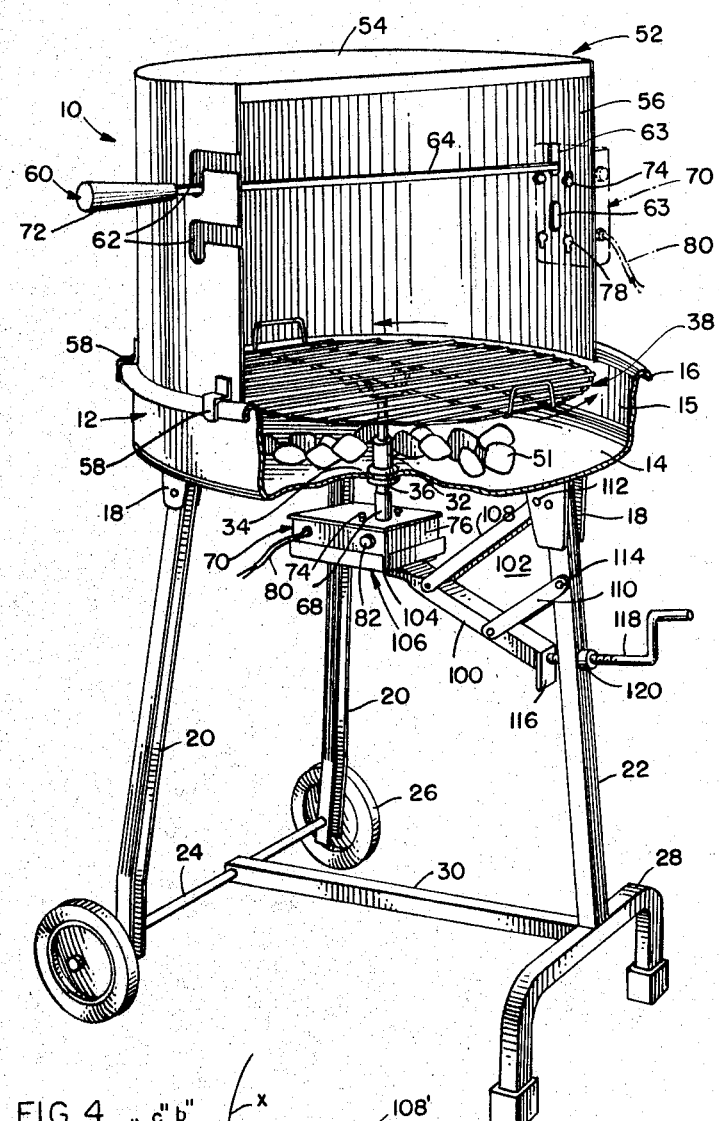

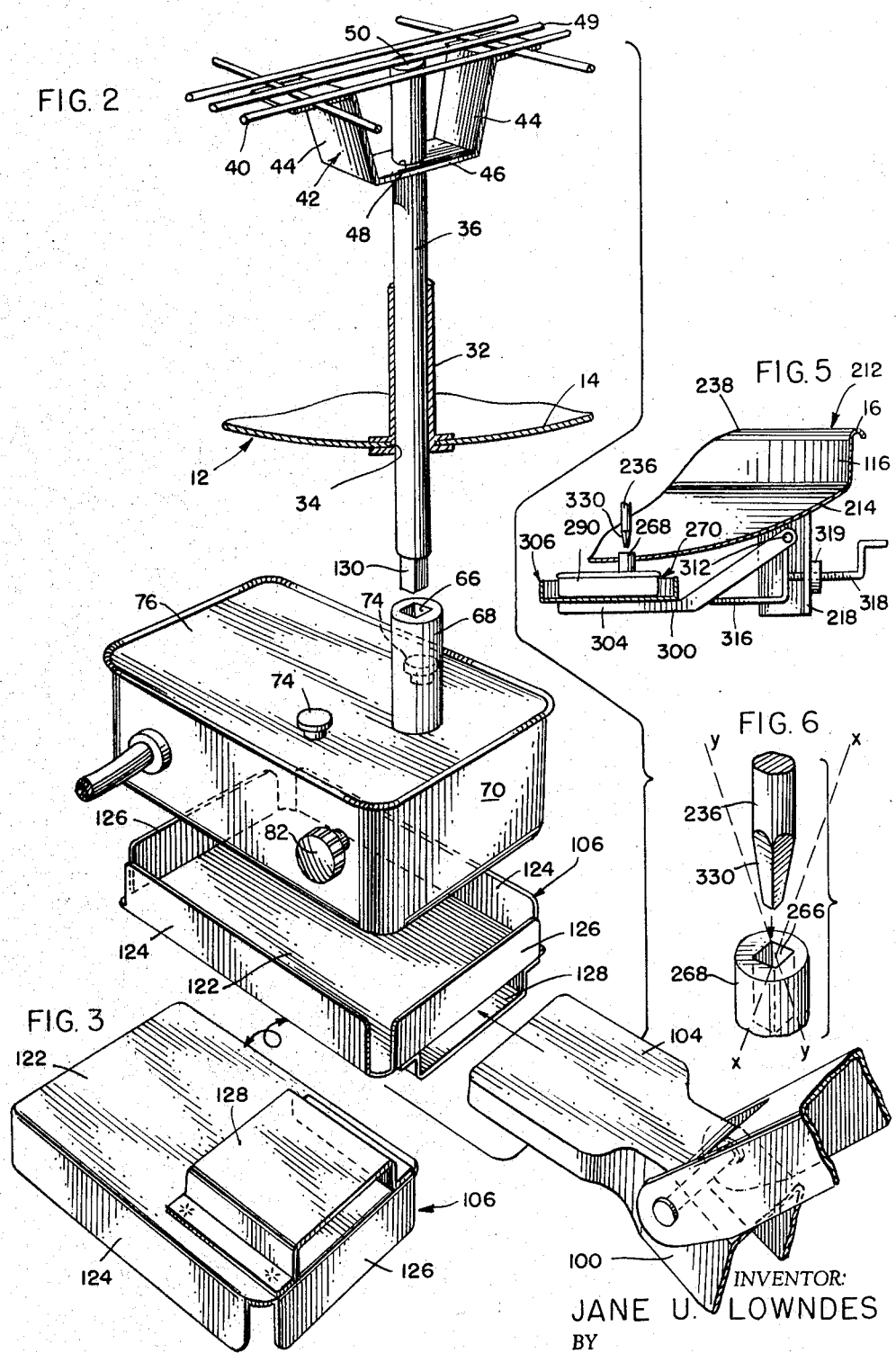
Jan. 17, 1967   J. U. LOWNDES   3,298,301
BARBECUE STAND WITH ROTARY GRIDIRON AND SPIT
AND COMMON DRIVE THEREFOR
Filed June 8, 1964                    2 Sheets-Sheet 2
INVENTOR:
JANE U. LOWNDES
BY
Edward R. Lowndes

3,298,301
BARBECUE STAND WITH ROTARY GRIDIRON
AND SPIT AND COMMON DRIVE THEREFOR
Jane U. Lowndes, 1607 Forest Ave.,
Wilmette, Ill. 60091
Filed June 8, 1964, Ser. No. 373,210
3 Claims. (Cl. 99—340)

The present invention relates to outdoor barbecue stands and has particular reference to a novel barbecue stand of the charcoal burning type, having facilities for selectively broiling meat on a rotary gridiron or on a rotisserie spit, both broiling instrumentalities being power driven and with a common electrically powered driving unit being selectively positionable on the framework of the stand to accommodate either instrumentality.

There is upon the market at the present time a type of barbecue stand involving both a rotary gridiron and a rotatable rotisserie spit. Such an article has become well standardized, there being little difference between the barbecue stands produced by countless manufacturers. Briefly, such stands comprise a circular bowl supported upon legs and providing a coal pit adapted to receive therein a layer of charcoal for fueling purposes. A central shaft projects vertically and slidably through a central bottom hole in the bowl, the lower end of the shaft being supported upon an underslung rocker arm and the upper end of the shaft loosely and rotatably receives thereon a circular gridiron. By adjusting the angularity of the rocker arm under the control of a crank, the shaft may be raised or lowered endwise and, as a consequence, the elevation of the gridiron above the charcoal fire will be adjusted. The gridiron rotates freely upon the upper end of the shaft and may be manually turned from time to time to avoid localized concentration of heat on the food undergoing broiling. A semi-cylindrical hood is removably positionable above the bowl and has an open side which gives access to the fire within the bowl. A combined motor and gear box is attached by means of bayonet slot connections to one side of the hood and is provided with an output drive collar having a square socket therein which removably receives the squared end of a spit, the latter extending diametrically across the hood at an appreciable elevation above the bowl. Usually, in connection with such stands, when the rotisserie is in use the gridiron is not used and is removed, although occasionally the gridiron is left in place for conjoint broiling operations with the spit. In either event, when the gridiron is used it must be manually turned for selective placement of the articles thereon with respect to the burning coals therebeneath.

The present invention is designed to extend the usefulness of such conventional and standardized barbecue stands without appreciably increasing the cost thereof, as well as to overcome certain limitations that are attendant upon their use. Obviously, since the gridirons of such stands are motionless unless turned by hand, they cannot be left unattended for any appreciable length of time. Rare indeed is the self-appointed "chef" who can build a charcoal fire with such even heat-distributing characteristics that it may be left unattended for the entire duration of a broiling operation on one side of a pot roast, for example; but not so rare is the resultant product when the "chef" returns to find his efforts, as well as the pot roast, charred to a cinder. Obviously, to automatically rotate the gridiron would be to evenly distribute the heat of the charcoal fire over the product undergoing broiling, regardless of whether the coals themselves are evenly distributed in the bowl or evenly ignited. However, to devise a practical means for thus rotating the gridiron without appreciably raising the cost of the barbecue stand, and one which may be put to use at will by an unskilled operator, poses a problem which the present invention has obviated.

According to the present invention, the widely standardized design and construction of the conventional barbecue stand, as outlined above, has not been appreciably altered. No separate motor is required for driving the gridiron and no train of gearing or power train involving additional parts over and above those present in the standardized design and construction are required according to one contemplated form of the invention. In another form of the invention, only a slight modification of the gridiron-supporting rocker arm construction is involved. In all contemplated forms of the invention, the conventional driving unit which is employed for rotating the rotisserie spit is also employed for rotating the gridiron. Also, in all contemplated forms, means are provided for translating the swinging angular movement of the gridiron-elevating rocker arm into vertical straight-line motion of the gridiron-supporting shaft.

The provision of a barbecue stand of the character briefly outlined above being the principal and general object of the invention, it is a further object, in one form of the invention, to provide a motion-translating means between the rocker arm and vertical gridiron-supporting shaft, involving a novel four bar linkage which is effective through a limited but effective range of swinging movement of the rocker arm to maintain substantially accurate end-to-end alignment between the gridiron-supporting shaft and the drive collar of the conventional motor and gear box ordinarily employed for rotating the rotisserie spit and additionally employed in the present invention for rotating the gridiron.

A still further object of the invention is to provide a dual purpose barbecue stand, as set forth above, wherein the combined motor and gear box, when employed for rotating the gridiron, is shielded from direct radiation of heat from the burning coals within the charcoal pit of the bowl.

Yet another object of the invention is to provide such a dual purpose barbecue stand in which changeover operations from driving the rotisserie spit to driving the gridiron, and vice versa, may be made while the charcoal fire is in the bowl and is effectively burning, without disturbing such fire or the position of the charcoal embers associated therewith, or without disturbing the product undergoing broiling on the rotating gridiron.

A similar and related object is to provide such a dual purpose barbecue stand in which changeover operations may be effected manually without requiring the use of any tools whatsoever and, if desired, even without shutting off the supply of electric current to the combined motor and gear box, the changeover being made in a matter of a few seconds while the gridiron continues to rotate.

Another and important object of the invention is to provide a dual purpose barbecue stand, selectively effective for gridiron and rotisserie broiling, and which, when employed for gridiron broiling, utilizes the conventional crank arm in the usual manner of operation to effect raising and lowering of the gridiron, while at the same time maintaining continuity of the power drive to the rotating rotisserie. Thus, no new skills are required of an operator over and above those obtained by experience with conventional barbecue stands.

Numerous other objects and advantages of the invention, not at this time enumerated, will readily suggest themselves as the nature of the invention is better understood.

In the accompanying two sheets of drawings forming a part of this specification, two illustrative embodiments of the invention have been shown.

In these drawings:

FIG. 1 is a front perspective view of a barbecue stand constructed according to the present invention;

FIG. 2 is an enlarged, fragmentary, exploded, perspective view of a portion of the motion-translating means whereby drive collar and shaft alignment is attained;

FIG. 3 is a bottom perspective view of a power unit supporting tray employed in connection with the invention;

FIG. 4 is a diagram illustrating the operation of a four bar linkage employed in connection with the invention;

FIG. 5 is a fragmentary view, partly in section and partly in elevation, showing a modified form of motion-translating means whereby drive collar and shaft alignment is attained; and FIG. 6 is an enlarged fragmentary exploded perspective view of loose coupling connection between the drive collar and shaft and employed in connection with the modified motion-translating means of FIG. 6.

Referring now to the drawings in detail and in particular to FIG. 1, a barbecue stand constructed according to the present invention has been designated in its entirety at 10 and is of the outdoor portable type. In over-all appearance, the barbecue stand 10 does not differ appreciably from a widely used barbecue stand currently available upon the market, such a stand, as well as the present one, including a relatively shallow circular combustion bowl 12 having a dished bottom 14, an upstanding cylindrical side wall 15 and an open circular rolled rim 16. Brackets 18, welded to the underneath side of the bottom 14 at appropriate regions serve to retain the upper ends of a pair of rear supporting legs 20 and the upper end of a front leg 22. The three legs are slightly divergent and the rear legs 20 are connected at their lower ends by an axle 24 which supports a pair of traction wheels 26. The lower end of the front leg 22 carries a divided pedestal support 28. A tie bar 30 extends between the pedestal support 28 and the rear axle 24.

A tubular sleeve 32 is fixedly secured in a central opening 34 formed in the bowl bottom 14 and projects vertically therethrough. As best seen in FIG. 2, a gridiron-supporting shaft 36 is vertically slidable in the sleeve 32 and the upper end of the shaft serves to support a rotatable gridiron 38. The gridiron 38 is freely rotatable upon the upper end of the shaft 36 and it involves in its general organization a circular wire grid portion 40 and a U-shaped bracket 42 having legs 44 welded to the grid portion 40 and a connecting bight portion 46 provided with a hole 48 therein for reception therethrough of the shaft 36. The upper end 50 of the shaft 36 is flat and supports thereon the diametrically extending wire 49 associated with the circular grid portion 40. The grid portion 40 may thus be rotated by hand upon the shaft 36 which supports it but, according to the present invention, means are provided for rotating the shaft 36 so that the grid will derive rotational motion from the shaft by reason of its frictional engagement therewith.

A quantity of charcoal, or charcoal briquettes, such as are shown at 51 in FIG. 1, is adapted to be positioned upon the bowl bottom 14 and the gridiron 38 is adjustably positioned at an appropriate distance above the level of the charcoal for the broiling of foodstuff positioned on the gridiron in the usual manner of operation of such barbecue stands. A semi-cylindrical hood 52 having a semi-circular top wall 54 and a curved side wall 56 presenting an open front side seats upon the rim 16 by means of brackets 58. The hood 52 constitutes a rotisserie section for the barbecue stand 10 and, accordingly, means are provided for rotatably supporting a rotisserie spit 60 diametrically thereacross at either of two selected elevations. Toward this end, a pair of bayonet slots 62 on one side of the wall 56 register horizontally with cooperating slots 63 on the opposite side of the wall and selectively receive thereacross the spit 60.

The spit 60 includes a spit proper 64 which is in the form of a length of rod stock, square in transverse cross section, and having the usual pointed end (not shown) which is adapted to be telescopically received in a square socket 66 provided in a drive collar 68 associated with a combined motor and gear reduction box 70 (see also FIG. 2) which constitutes a power unit for drivingly rotating the spit 60. The spit 60 further includes a manipulating handle 72.

The combined motor and gear reduction box 70 is a self contained package-type unit and the collar 68 constitutes the output drive element thereof. A pair of headed studs 74 on the housing 76 of the power unit are adapted to be selectively hooked into pairs of bayonet slots 78 in the wall 56 so that the unit may be hung on the wall with its drive collar 68 in register with either of the two slots 63. A flexible lead 80 serves to conduct current from a suitable electric outlet to the motor of the power unit. An off-on switch (not shown) operates under the control of a knob 82 to energize the motor at will.

The arrangement of parts thus far described is purely conventional and no claim is made herein to any novelty associated with the same, this arrangement being a common one and being obtainable at substantially all establishments which handle barbecue equipment. The novelty of the present invention resides rather in the provision of a power drive for the gridiron-supporting shaft 36 to the end that the gridiron may automatically be rotated, while at the same time the shaft may be shifted vertically and endwise to vary the elevation of the gridiron, all in a manner that will now be set forth in detail.

According to the present invention, the power unit 70 which is employed for driving the rotisserie spit 60 is also employed for driving the gridiron 38, suitable means being provided for supporting the power unit 70 beneath the bowl 12 so that the drive collar 68 registers with and receives the lower end of the drive shaft 36, and suitable means also being provided whereby the elevation of the power unit 70 as a whole may be varied to raise and lower the drive shaft, and consequently the gridiron 38. This means consists of a rocker arm 100 which constitutes an element of a four bar linkage 102 (FIGS. 1 and 4), the rocker arm being formed with a laterally turned extension 104 which constitutes a sliding support for a power unit-supporting tray 106. The purpose of the four bar linkage 102 is to maintain the rocker arm 100 at all times in a position so that the extension or support 104 will remain horizontal.

The rocker arm 100 is supported at the lower ends of a pair of links including an upper relatively long link 108 and a lower relatively short link 110. The upper end of the link 108 is pivoted as at 112 to the rearmost bracket 18, while the upper end of the link 110 is pivoted as at 114 to the leg 22. The forward lower end of the rocker arm 100 is provided with a downturned flange 116 presenting a flat forward reaction surface designed for camming engagement with the rear end of a crank 118 which is threadedly received through a nipple 120 carried on the leg 22. Turning of the crank 118 in one direction will cause the rocker arm 100 to swing rearwardly and upwardly, thus elevating the tray 106. Conversely, turning of the crank in the opposite direction will serve to lower the tray.

As best seen in FIGS. 2 and 3, the tray 106 is of shallow cup shape configuration and includes a bottom wall 122, and upstanding side and end walls 124 and 126 respectively. A strap like guide bracket 128 is secured to the underneath side of the bottom wall 122 and slidably receives therein the laterally turned end or extension 104 of the rocker arm 100.

As previously stated, the tray 106 is adapted to receive and support therein the power unit 70 in such a position that the output drive collar 68 thereof is in vertical register with the opening 34 in the bottom wall 14 of the bowl 12. When so positioned, the squared socket 66 in the drive collar 68 receives and is drivingly coupled to the lower end of the gridiron-supporting shaft 36, the lower end of the shaft being squared as at 130 to conform to the socket 66.

From the above description it will be apparent that when the crank 118 is turned in a direction to raise the gridiron 38, the rocker arm 100 will swing rearwardly and upwardly, thus raising the tray 106 and the power unit 70 supported therein. Raising of the power unit 70 will, of course, cause the drive shaft 36 to be shifted vertically upwardly in endwise fashion so as to, in turn, raise the gridiron 38. Since the shaft 38 is rotatably confined in the tubular sleeve 32 and is incapable of shifting radially with respect to the bowl 12, the shaft will hold the power unit 70, and consequently the tray 106 against rearward movement and the strap-like guide bracket 128 will slide with respect to the rocker arm extension 104. Thus only the vertical components of motion of the rocker arm 100 will be translated to the tray 106 and power unit 70. The horizontal components of motion of the rocker arm will be assimilated by the lost motion connection which includes the extension 104 and the guide bracket 128.

The previously mentioned four bar linkage 102 is provided for the purpose of minimizing misalignment of the drive shaft 36 and drive collar 68 during vertical movement of the same. This four bar linkage, in effect, serves to maintain the extension 104 and tray 106 substantially horizontal during the effective raising and lowering movements of the gridiron 38.

The geometrical considerations associated with the four bar linkage 102 are diagrammatically represented in FIG. 4 wherein the lines 108' and 110' represent the links 108 and 110 respectively; the line 22' represents the portion of the front leg 22 between the links 108 and 110; and the line 100' represents the portion of the rocker arm 100 between the links 108 and 110. The points 112' and 114' represent the pivot points 112 and 114. These two latter points 112' and 114' are considered to be fixed points about which the lines 108' and 110' may swing angularly to describe the arcs shown in dotted lines and designated at $x$ and $y$ respectively. The position of the four bar linkage in FIG. 4 is commensurate with the position of the four bar linkage 102 of FIG. 1.

Considering now that the crank 118 is rotated in a direction to raise the tray 106, power unit 70, shaft 68 and gridiron 38, immediately prior to such rotation the distal ends of the lines 110' and 108' lie on the arcs $y$ and $x$ at the points $a$ and $a'$ while the extension 104 projects horizontally, its position being indicated at $a''$. When the distal end of the line 110' arrives at the point $b$, the distal end of the line 108' moves to the point $b'$ and the extension 104 still remains substantially horizontal because the increments of vertical movement between the points $a$ and $b$ on the arc $y$ increase more rapidly than do the increments of vertical movement between the points $a'$ and $b'$ on the arc $x$. During movement of the distal ends of the lines 110' and 108' through the points $c'$ and $d'$ the extension 104 remains substantially horizontal as indicated at $c''$ and $d''$, but at the time that the distal end of the arm 110' arrives at the point $e$ the extension 104 dips sharply from a horizontal position as indicated at $e''$. With the distal end of the lines 110' at the points $f$, $g$ and $h$, the extension 104 assumes the positions represented at $f''$, $g''$ and $h''$ respectively. Points on the arc $x$ corresponding to points $f$, $g$ and $h$ have been omitted in the interests of clarity since they would progress backwardly on the arc. In the structure of FIG. 1, the extension 104 is capable of moving only in the range represented by the positions $a''$, $b''$, $c''$ and $d''$. This is a very limited range representing a variation of only two or three inches difference in elevation of the gridiron 38. In this range however the extension 104, which supports the power unit 70, remains substantially horizontal.

The term "four bar linkage" as employed herein is not a coined expression for purposes of description of the present invention. This term has long had engineering acceptance as evidenced by various publications, including books, technical papers and the like. For example, an article entitled "Four Bar Linkage Proportions" written by Preben W. Jensen was published in Product Engineering on September 19, 1960. The term "four bar linkage" may be defined as an articulated linkage consisting of four bars pivoted serially to one another at adjacent ends to provide a parallelogram type closed loop. A four bar linkage implies that there shall be two opposed pairs of links. If the links of each opposed pair are of equal length, the resultant structure is a true articulated parallelogram. If the opposed bars of only one pair of bars are of equal length, the resultant structure is a trapezoid. If the bars of neither pair are of equal length, the resultant structure is a trapezium. The use of a true parallelogram in the present instance would maintain the extension 104 horizontal at all times but due to the slant of the front leg 22 of the barbecue stand and other considerations, a parallelogram linkage is impractical. Therefore, use is made of the very small limited range associated with a four bar linkage of the trapezoidal type wherein the lines represented at $a''$, $b''$, $c''$ and $d''$ in FIG. 4 remain horizontal, to maintain the tray 106 horizontal so that axial alignment between the drive shaft 36 and drive collar 68 will be preserved during raising and lowering of the gridiron 38.

The form of the invention just desecribed and illustrated in FIGS. 1 and 2 is intended for use where the squared lower end 130 of the gridiron-supporting drive shaft 36 and the square socket 66 in the drive sleeve 68 are conformable within fairly close tolerances so that axial misalignment between the shaft and sleeve would cause binding. In the form of the invention shown in FIGS. 5 and 6, wide tolerances are maintained so that the drive shaft and drive sleeve have an extremely loose fit and it is not necessary to maintain the supporting tray for the power unit 70 horizontal through its range of vertical movement. Accordingly, the four bar linkage 102 of the form of the invention shown in FIGS. 1 and 2 is not employed.

In the form of the invention shown in FIGS. 5 and 6, the framework of the barbecue stand including the bowl, its supporting legs, the hood, etc. remains susbtantially the same as in the previously described form and only the gridiron raising and lowering mechanism has been changed. Accordingly, to avoid needless repetition of description, corresponding reference numerals, but of a higher order, have been applied to the corresponding parts as between the disclosures of FIG. 1 and FIGS. 5 and 6.

Referring now to FIGS. 5 and 6 in detail, the links 108 and 110 of the four bar linkage 102 have been omitted and the proximate end of the rocker arm 300 is pivoted at 312 directly to the sides of a depending bracket 218 on the bowl bottom 214 so that its angularly turned distal end region 304 underlies the guide sleeve 232 and drive shaft 236. The tray 306 which slidingly supports the power unit 270 is fixed to the end region 304 of the rocker arm and its dimensions are such that they exceed slightly the dimensions of the power unit 270. An angular piece 316 affords the necessary flat end face for engagement with the end of the crank arm 318 which operates in a threaded nipple 302 secured in the bracket 218.

The lower end region of the vertical drive shaft 236 is tapered and squared as indicated at 330 and it is designed for loose reception in a squared socket 266 provided in the drive collar 268 of the power unit 270. The lower end of the drive shaft 236 may, if desired, be supported upon the bottom of the socket 266 so that there will be considerable circumferential play between the four faces of the squared end region 330 and the walls of the socket without binding. This allows for angular misalignment between the drive shaft and drive sleeve without binding while at the same time maintaining a drive coupling between the two parts. The axes x—x, y—y and z—z of FIG. 6 indicate that a positive drive through a range of angular misalignment as great as 20° may be maintained although, in practice, an angular misalignment of over two or three degrees is not encountered, this considering the very small range of vertical swinging movement of the rocker arm 300 necessary to give the desired increase in elevation to the gridiron 238.

The invention is not be limited to that exact arrangement of parts shown in the accompanying drawings or described in this specification, as various changes in the details of construction may be resorted to without departing from the spirit of the invention. Therefore, only insofar as the invention has particularly been pointed out in the accompanying claims is the same to be limited.

Having thus described the invention, what I claim and desire to secure by Letters Patent is:

1. In a portable outdoor barbecue stand for selective rotisserie and gridiron broiling, in combination, a framework including a shallow circular combustion bowl having an open upper rim and a bottom wall provided with a central opening, supporting legs for said bowl, and a semi-cylindrical hood having a curved side wall removably supported on the rim of the bowl, said side wall being provided with slots at diametrically opposed regions for reception therethrough of a horizontally disposed spit, a spit projecting through said slots and supported at its opposite ends therein, a gridiron-supporting drive shaft projecting vertically through said central opening in the bottom wall and slidable endwise therein, a gridiron supported on the upper end of said drive shaft above the bottom wall, a power unit for selectively driving said spit and gridiron and having a rotatable output drive collar provided with a non-circular end socket therein, the lower end of said drive shaft and one end of said spit being shaped conformably to said socket and being designed for selective reception therein in coupled relationship, interengaging means on the side wall of said hood and on said power unit for removably supporting the latter in the vicinity of one of said slots with the axis of the drive collar extending horizontally to receive the adjacent end of the spit, a rocker arm movably mounted on the framework for swinging movement in a vertical plane toward and away from said central opening, a tray on said rocker arm for loosely supporting said power unit under the influence of gravity and in a position wherein said drive collar is in vertical alignment with said opening for reception of the lower end of the drive shaft in said socket, and a crank arm having a threaded connection with the framework and engageable with said rocker arm for adjusting the position of the latter to vary the elevation of said tray and power unit, and consequently of said drive shaft and gridiron supported thereby.

2. In a portable outdoor barbecue stand for selective rotisserie and gridiron broiling, in combination, a framework including a shallow circular combustion bowl having an open upper rim and a bottom wall provided with a central opening, supporting legs for said bowl, and a semi-cylindrical hood having a curved side wall removably supported on the rim of the bowl, said side wall being provided with slots at diametrically opposed regions, a rotisserie spit projecting through said slots and supports at its opposite ends therein, a gridiron-supporting drive shaft projecting vertically through said central opening in the bottom wall and slidable endwise therein, a gridiron supported on the upper end of said drive shaft above the bottom wall, a power unit for selectively driving said spit and gridiron and having a rotatable output drive collar provided with a non-circular end socket therein, the lower end of said drive shaft and one end of said spit being shaped conformably to said socket and being designed for selective reception therein in coupled relationship, interengaging means on the side wall of the hood and on said power unit for removably supporting the latter in the vicinity of one of said slots with the axis of the drive collar extending horizontally to receive the adjacent end of the spit, a rocker arm movably mounted on the framework for swinging movement in a vertical plane toward and away from said central opening, a tray mounted for limited sliding movement on said rocker arm for supporting said power unit in a position wherein said drive collar is in vertical alignment with said opening for reception of the lower end of the drive shaft in said socket, and a crank arm having a threaded connection with the framework and engageable with said rocker arm for adjusting the position of the later to vary the elevation of said power unit, and consequently of said drive shaft and gridiron supported thereby.

3. In a portable outdoor barbecue stand, the combination set forth in claim 2 including, additionally, a four bar linkage by means of which the rocker arm is movably mounted on the framework, said four bar linkage comprising an upper link pivotally connected at one end to the rocker arm and at its other end to the framework, and a lower link pivotally connected at one end to the rocker arm at a point removed from the point of pivotal connection between the upper link and rocker arm, said lower link having its other end pivotally connected to the framework at a point removed from the point of pivotal connection between the upper link and the framework, the length of said links and the location of their points of pivotal connection between the framework and rocker arm being such that the portion of the rocker arm which is in vertical alignment with said central opening in the bottom wall is constrained to move in a vertical path.

References Cited by the Examiner

UNITED STATES PATENTS

| | | | |
|---|---|---|---|
| 3,033,190 | 5/1962 | Atkinson | 126—25 |
| 3,131,685 | 5/1964 | Bergfield | 126—25 |
| 3,134,320 | 5/1964 | Meyer | 126—25 |

WILLIAM I. PRICE, *Primary Examiner.*